(12) United States Patent
Ulewicz

(10) Patent No.: US 12,127,070 B2
(45) Date of Patent: Oct. 22, 2024

(54) GEOFENCE TRACKING WITH DEVICE LOCATION PRIVACY

(71) Applicant: Amazon Technologies, Inc., Seattle, WA (US)

(72) Inventor: Szymon Ulewicz, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 478 days.

(21) Appl. No.: 17/461,792

(22) Filed: Aug. 30, 2021

(65) Prior Publication Data

US 2023/0069458 A1 Mar. 2, 2023

(51) Int. Cl.
| | |
|---|---|
| *H04W 4/00* | (2018.01) |
| *H04L 9/32* | (2006.01) |
| *H04W 4/021* | (2018.01) |
| *H04W 12/037* | (2021.01) |
| *H04W 12/0431* | (2021.01) |

(52) U.S. Cl.
CPC ........... *H04W 4/021* (2013.01); *H04L 9/3242* (2013.01); *H04W 12/037* (2021.01); *H04W 12/0431* (2021.01)

(58) Field of Classification Search
CPC . H04W 12/64; H04W 12/03; H04W 12/0431; H04W 4/021; H04L 9/3242
See application file for complete search history.

(56) References Cited

U.S. PATENT DOCUMENTS

| | | | | |
|---|---|---|---|---|
| 9,680,827 | B2 * | 6/2017 | Ronca | .................... H04L 63/062 |
| 9,836,620 | B2 | 12/2017 | Jin | |
| 10,728,699 | B2 | 7/2020 | Phillips et al. | |
| 10,993,073 | B2 | 4/2021 | Jones | |
| 2013/0290707 | A1 * | 10/2013 | Sinclair | .................. H04L 9/3226 |
| | | | | 713/161 |
| 2013/0347058 | A1 * | 12/2013 | Smith | ...................... G06F 21/57 |
| | | | | 726/1 |
| 2015/0237470 | A1 | 8/2015 | Mayor et al. | |
| 2016/0146623 | A1 * | 5/2016 | Ren | ...................... G01C 21/3682 |
| | | | | 701/400 |
| 2018/0365432 | A1 * | 12/2018 | Chhabra | ............... H04L 63/107 |
| 2021/0081392 | A1 | 3/2021 | Hook | |

OTHER PUBLICATIONS

International Search Report and Written Opinion mailed Dec. 20, 2022 in PCT/US2022/075200, Amazon Technologies, Inc.

* cited by examiner

*Primary Examiner* — Shantell L Heiber
(74) *Attorney, Agent, or Firm* — S. Scott Foster; Kowert, Hood, Munyon, Rankin & Goetzel, P.C.

(57) ABSTRACT

A system for providing a geofence service is disclosed. The geofence service receives an encrypted geospatial index for a specified geofence based on application of a hash function to respective ones of a plurality of locations for the specified geofence in accordance with a secret key that is unknown to the geofence service. The geofence service stores the encrypted geospatial index to a data store according to a geofence identifier for the specified geofence. The geofence service receives an encrypted device location identifier generated based on application of the hash function to a representation of a current location of a user device in accordance with the secret key. The geofence service determines whether the user device is located in a location of the plurality of locations based on a query of the encrypted geospatial index according to the encrypted device location identifier.

20 Claims, 11 Drawing Sheets

304:
```
6c1d4c26cdf099a92b37501920ab625e4e4f881f203a10ed8034c4fe76d9a6d5
d0e2f5baa66799b56030276b7e8e664beb299658f90c62474737b3b7c5517f54
a5b86d2e5992281f0146323d0c5b43c7c1bd0bdf735f83b5bfce4466432eba2b
577cd9dcf7f228b49549d3dbda7603785d24f6bee7d3803cd919eb4d97069d91
c342651e47afdd59d16a4d50c38d47038eb19217f11395f74ed84d36b894e2cf9
b128405bd49cb378e4ad49bbea89ba17866b941f2efcf2b16ae70d8dfe730597
cab5115463d8afb7e066e05fb74bb575a8ca373f9ab2f28b7f240c84ddc13643
69c18214c6790f402697de037a4f62b427444ec2d1cfd53b1c0a67c3b4312e69
c2ed3eb3c28f08dd10c9073deadf76701addbfaf74650a6ba223a7b97132d114
d1e52c8ef6728d4a902790042469ff3430c2563f5a7f8807dc7ce38c209daa6b
2bc501b4d981b61084942aa85f70ab7cc7c110a80b3cbaaf9418db219500ba6b
a439ba137d15c1cac232f3328ab6d6f71bbfb51c269f62c3005c42aa19959906
d76d851701e73344bdcc03e8dd83f30e80c22a48962e988a0410d06bc9de920b
56e19e0097b21749aa9387c45db3bdb7df231a5768af4145b16f3c2731823643
74b41370d2c1762116a83b4b8c39270c2c0ad4cbc3fe5406ac8bd9a7cc25c9708
```

| 402 |
|---|
| 2221 |
| 22211 |
| 222110 |
| 2221100 |
| 22211002 |
| 222110020 |
| 2221100201 |
| 22211002011 |
| 222110020113 |
| 2221100201133 |
| 22211002011333 |
| 222110020113332 |
| 2221100201133320 |
| 22211002011333200 |
| 222110020113332000 |

| 404 |
|---|
| b91ac9e079441b04444a3f588057 68db5674 3825f677548e796b62ef086ee29e |
| 6ea18987402102f2d920aafec0491d3e145ddc9f2a21aef52d3d568dd9396814 |
| 8c002185dfdf2d9ad6dff8647af2f964b194dec7783d52071bfda6e3f6194542 |
| a9e6308252490af0289b7439ad2d55f2a98ae52679ed150d9283eab14e116bb6 |
| 698952ad68f7c3722e872a54fb43a49ae5e2359ae568d23b9ae1236d14cbfdbe |
| 826f1757937794e568907 1539a8769830 0fea580a5de5891f9cd86694de16d02 |
| e0136ca7e08bcb39f3896657bfac6bade3f917607d07b6c806582ab0aa73f542 |
| 7c22814ad30 54d7f8c52a613a39884d0d050660c3126a8f899e07bb7ef6b0edb |
| f526f777fb1f1aa37fadc740be1a38302bfdcc7dc83cb187b2cef77f0740de92c |
| 4c25fe64b6651886 00414c7ceb870485afa667ac44533ac402b59986245bf3bc |
| c8bdaf95bb42d1d4e9a0ba8f436a3cb997 87 93978 1238ec7dc2865ed963e50af |
| d336835f5ba5003f0f980f2af3bd382a0a3e05a6ee293ca6f57cae9e75cf9484 |
| 59b9f2861ac7c86fa9e70105a23fbd0c83ccbfe51dde30 0350 5f40e60ec0a248 |
| 1cb653d6a9cdda44179c9527096e5cf0a0c15a0dd8f74eef688e2014cba5ec92 |
| a67457f6084e8d45530792e635d5624eaa41a87dd7566803ad162ed46d775d35 |

Receive, at a geofence service from a client device, an encrypted geospatial index and an encrypted geometric representation of one or more locations for a geofence identified by a geofence identifier 702

Store or update the encrypted geospatial index at a data store according to the geofence identifier 704

Send an notification to an event bus indicating that the geofence is available at the geofence service 706

```
┌─────────────────────────────────────────────────────────────────┐
│ Determine a current location of a user device according to a   │
│ location sensor of the user device 802                          │
└─────────────────────────────────────────────────────────────────┘
                               ↓
┌─────────────────────────────────────────────────────────────────┐
│ Determine one or more numerical representations of the current  │
│ location of the user device, individual ones of the one or more │
│ numerical representations have different levels of precision of │
│ location tracking 804                                           │
└─────────────────────────────────────────────────────────────────┘
                               ↓
┌─────────────────────────────────────────────────────────────────┐
│ Generate one or more hashed representations of the current      │
│ location based on applying a hash function to the one or more   │
│ numerical representations of the current location according to  │
│ a secret key 806                                                │
└─────────────────────────────────────────────────────────────────┘
                               ↓
┌─────────────────────────────────────────────────────────────────┐
│ Randomize an order of the one or more hashed representations    │
│ of the current location 808                                     │
└─────────────────────────────────────────────────────────────────┘
                               ↓
┌─────────────────────────────────────────────────────────────────┐
│ Generate an encrypted representation of the current location    │
│ based on encrypting the one or more numerical representations   │
│ of the current location according to a cryptographic key 810    │
└─────────────────────────────────────────────────────────────────┘
                               ↓
┌─────────────────────────────────────────────────────────────────┐
│ Send the one or more hashed representations and the encrypted   │
│ representation of the current location to a geofence service    │
│ to allow the geofence service to determine whether the user     │
│ device is within a geofence 812                                 │
└─────────────────────────────────────────────────────────────────┘
```

```
┌─────────────────────────────────────────────────────────────────┐
│ Receive, at a geofence service, an encrypted device location   │
│ identifier and an encrypted representation of a current         │
│ location of a user device, where the encrypted device location │
│ identifier is generated based on the current location of        │
│ the user device 902                                             │
└─────────────────────────────────────────────────────────────────┘
                              │
                              ▼
┌─────────────────────────────────────────────────────────────────┐
│ Identify a geofence and an encrypted geospatial index for one   │
│ or more locations included within the geofence 904              │
└─────────────────────────────────────────────────────────────────┘
                              │
                              ▼
┌─────────────────────────────────────────────────────────────────┐
│ Query the encrypted geospatial index according to the encrypted │
│ device location identifier 906                                  │
└─────────────────────────────────────────────────────────────────┘
                              │
                              ▼
                      ╱ Determine whether the ╲
                    ╱ encrypted device location ╲      NO
                   ⟨  identifier is included in the ⟩─────┐
                    ╲ encrypted geospatial index  ╱       │
                      ╲        908         ╱              │
                              │                           │
                             YES                          │
                              ▼                           │
┌─────────────────────────────────────────────────────────────────┐
│ Send a notification to an event bus indicating that the current │
│ location of the user device is within the one or more locations │
│ of the geofence based on results of the query, where the        │
│ notification includes the one or more encrypted representation  │
│ 910                                                             │
└─────────────────────────────────────────────────────────────────┘
                                                          │
┌─────────────────────────────────────────────────────────────────┐
│ Send a notification to the event bus indicating that the current│
│ location of the user device is not within the one or more       │
│ locations of the geofence based on the results of the query,    │◀┘
│ where the notification includes the one or more encrypted       │
│ representation 912                                              │
└─────────────────────────────────────────────────────────────────┘
```

```
┌─────────────────────────────────────────────────────────────┐
│ Receive, at a client device from a geofence service,        │
│ information including an indication of whether a current    │
│ location of a user device is located within a geofence and  │
│ an encrypted representation of the current location 1002    │
└─────────────────────────────────────────────────────────────┘
                              ↓
┌─────────────────────────────────────────────────────────────┐
│ Decrypt the encrypted representation of the current         │
│ location according to a cryptographic key to generate a     │
│ decrypted representation of the current location            │
│                          1004                               │
└─────────────────────────────────────────────────────────────┘
                              ↓
┌─────────────────────────────────────────────────────────────┐
│ Verify whether the current location of the user device is   │
│ located within the geofence based on the decrypted          │
│ representation of the current location 1006                 │
└─────────────────────────────────────────────────────────────┘
                              ↓
┌─────────────────────────────────────────────────────────────┐
│ Perform one or more tasks of a location-based application   │
│ or service based on whether the current location of the     │
│ user device is within the geofence 1008                     │
└─────────────────────────────────────────────────────────────┘
```

FIG. 10

GEOFENCE TRACKING WITH DEVICE LOCATION PRIVACY

BACKGROUND

Computing service providers, such as application providers, offer various types of applications and services that can perform different functions based on locations of end users and their user devices. Some applications may wait for the user devices to enter a given location before performing additional functions. The given location may be tracked as part of a geofence as part of the application. The user device may determine its current location and report the current location to the application to determine whether the user device is within the geofence.

The geofence may also be managed by an external service operated by a service provider in order to offload computing resource utilization from the application provider to the service provider. The application provider may provide information indicating the locations of the geofence to the service provider. The user device may report the current location to the service provider. The service provider may be aware of the current location to determine whether the current location is within the geofence. The current location of the user device would not be kept private from the service provider when the service provider is managing the geofence for the application provider.

BRIEF DESCRIPTION OF THE DRAWINGS

FIG. 3 illustrates representations of geofence locations for a geofence, according to some embodiments.

FIG. 4 illustrates representations of a current location of a user device, according to some embodiments.

FIG. 7 illustrates a flowchart diagram for a method for establishing a geofence at a geofence service on behalf of a client, according to some embodiments.

FIG. 8 illustrates a flowchart diagram for a method for a user device generating an encrypted representation of a current location of the user device to be sent to a geofence service on behalf of a client, according to some embodiments.

FIG. 9 illustrates a flowchart diagram for a method for determining whether a user device is in a geofence location based on an encrypted device location identifier, according to some embodiments.

FIG. 10 illustrates a flowchart diagram for a method for implementing a location-based application or service that receives indications of whether a user device is at a geofence location, according to some embodiments.

Figure 1:
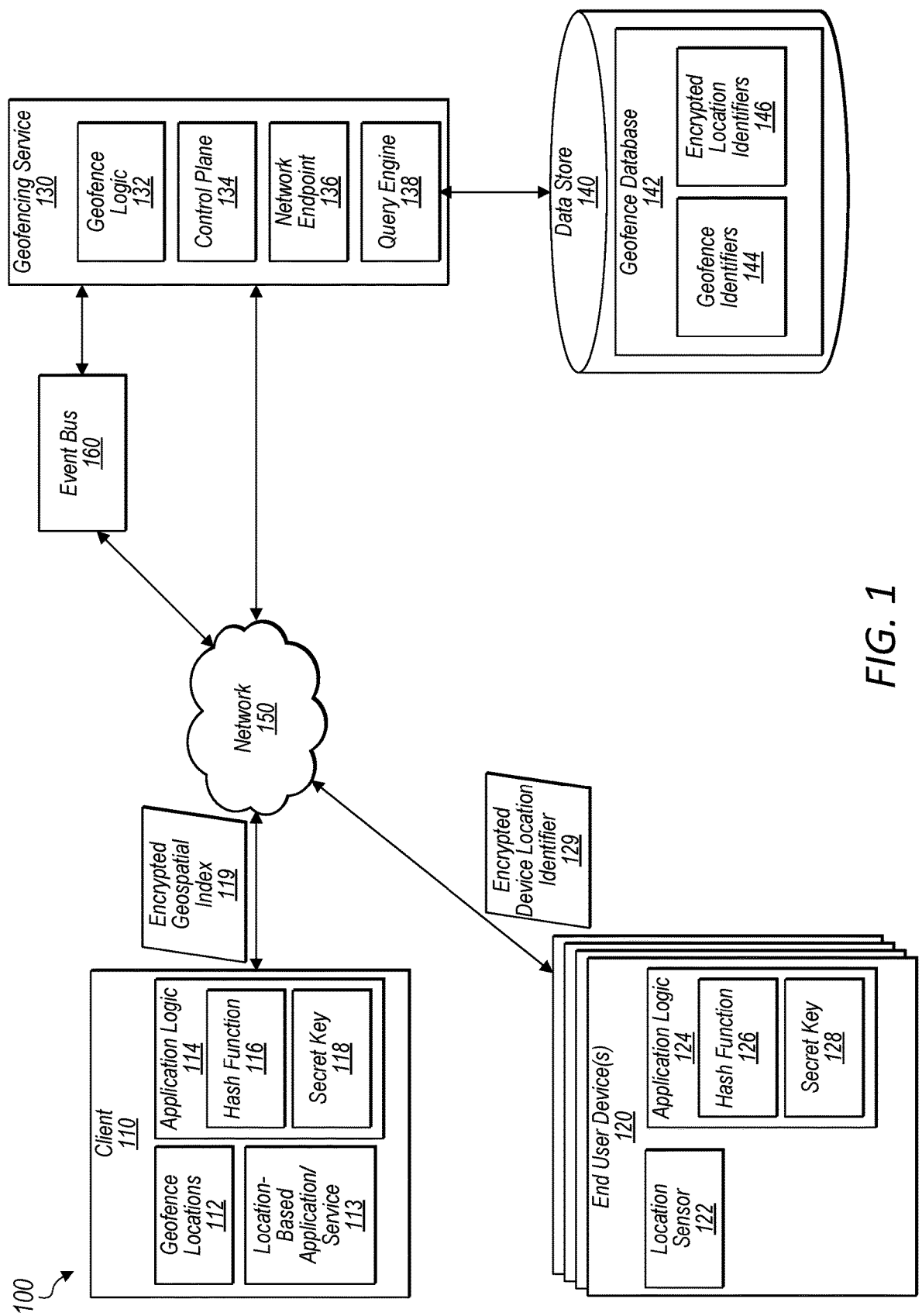
FIG. 1 illustrates a geofence system configured to provide geofence functionality that maintains privacy of end users, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of systems and processes for geofencing while maintaining user device location privacy are disclosed herein. A system may include a service provider network that includes many computing resources configured to provide services to various clients. The clients may include application developers or providers that offer applications or downstream services to end users. The clients may deploy the applications to various devices that are operated by the end users, such as mobile devices or personal computers. The applications may include one or more functions that depend on physical properties of the devices used to execute the applications. For example, an application may include a location-based function that depends on a current location of the devices running the application. In some situations, functions of the application may depend on where a given device is located. In other situations, the application may be configured to perform certain tasks based on a determination that the device has entered or left a designated location or region, which may be referred to as geofencing.

The clients may configure the applications to use one or more services of the provider network to perform various tasks. For example, the application may utilize a geofence service of the provider network to determine whether devices executing the application are located in designated locations. In some situations, the client may elect to use the geofence service while maintaining privacy of the end users. For example, the client may desire to not have the provider network be aware of the locations of the end users even though the provider network may be implementing the location service on behalf of the application. Additionally, the provider network may provide, as part of the geofence service, an assurance that the provider network will not be able access or determine the locations of the end users or their devices.

In some implementations, the client may take additional steps to prevent the provider network from deciphering or interpreting the locations that are within the geofence of the application. For example, the client may provide an encrypted geospatial index that includes encrypted representations of the locations defining the geofence. The client may generate the encrypted representations based on applying a hash function to representations of the locations that are included in the geofenced area(s). The client may convert a geometric representation of the locations included in the geofence into cell data that includes numerical identifiers representing the locations based on application of a geospatial indexing algorithm. In some situations, the client may further encrypt or hash the numerical identifiers to further obfuscate the locations such that the provider network is unable to decipher, interpret or reverse engineer the locations from the encrypted geospatial index. The client may also randomize or shuffle the order of the encrypted numerical identifiers to further obfuscate the locations to the provider network. The client may provide the geofence, including the encrypted geospatial index, to the geofence service of the provider network.

The geofence service may receive the encrypted identifiers and store the encrypted identifiers to a data store or a database for the geofence of the client. In some situations when the geofence service has an existing geofence for the client, the geofence service may update the existing geofence with the encrypted identifiers. The geofence service may then determine whether another device is located within the geofence based on querying the database.

User devices that execute the client's application may be configured to provide an encrypted representation of the location of the user device in order to have the geofence service determine whether the user device is located within the geofence. The user device may include components that are configured to determine a current location of the user device. For example, the user device may include global positioning satellite (GPS) hardware that is configured to determine the current location of the user device. The user device may be configured to generate an encrypted representation of the current location according to the hash function that was used to generate the encrypted location identifiers that comprise the geofence.

The user device may send the encrypted representation of the current location to the geofence service to have the geofence service determine whether the user device is located within the geofence based on the encrypted representation of the current location. The user device may be configured to send the encrypted representation of the current location without sending a decipherable representation of the current location such that the geofence service would be unable to determine the current location of the user device.

The geofence service may query the encrypted geospatial index according to the encrypted representation of the current location to determine whether the user device is currently located within a geofence location. The geofence service may perform the query without having access to information indicating the current location because the encrypted representations are not able to be converted back to the current location.

In one embodiment, a system is described. The system may include one or more computing devices comprising one or more processors and one or more memories. The memory stores instructions that, when executed on or across the one or more processors, cause the one or more computing devices to implement a geofence service. The geofence service may receive an encrypted geospatial index for a specified geofence comprising a geofence location hash value generated based on application of a hash function to respective ones of a plurality of locations for the specified geofence in accordance with a secret key, wherein the secret key is unknown to the geofence service. The geofence service may store the encrypted geospatial index to a data store according to a geofence identifier for the specified geofence. The geofence service may further receive an encrypted device location identifier comprising a hash value generated based on application of the hash function to a representation of a current location of a user device in accordance with the secret key. The geofence service may also determine whether the user device is located in a location of the plurality of locations based on a query of the encrypted geospatial index according to the encrypted device location identifier. The geofence service may further based on a determination that the user device is located in the location of the plurality of locations, provide an indication that the user device is located in the location of the plurality of locations.

In another embodiment, a method is described. The method may include receiving, by a geofence service, an encrypted device location identifier generated based on application of a hash function to a representation of a current location of a user device in accordance with a secret key. The method may also include querying an encrypted geospatial index for a geofence according to the encrypted device location identifier to determine whether the user device is located within a geofence location of the geofence, wherein the encrypted geospatial index is generated based on application of the hash function to the geofence in accordance with the secret key. The method may further include based on a determination that the user device is located within the geofence location, providing an indication that the user device is located in the geofence.

In yet another embodiment, one or more computer-readable storage media are described. The storage media may store instructions that, when executed on or across one or more processors, cause the one or more processors to implement a geofence service. The geofence service may be configured to in response receipt of an encrypted device location identifier generated based on application of a hash function to a representation of a current location of a user device in accordance with a secret key, identifying an encrypted geospatial index for a geofence for the user device. The geofence service may also include querying the encrypted geospatial index according to the encrypted device location identifier to determine whether the user device is located within a geofence location of the geofence, wherein the encrypted geospatial index is generated based on application of the hash function to the geofence in accordance with the secret key. The geofence service may further include based on a determination that the user device is located within the geofence location, providing an indication that the user device is located in the geofence.

FIG. 1 illustrates a geofence system 100 configured to provide geofence functionality that maintains privacy of end users, according to some embodiments. The geofence system 100 may include a client 110, end user devices 120, a geofence service 130, and a data store 140, according to some embodiments. The client 110, end user devices 120, and the geofence service 130 may be interconnected via a network 150. In some embodiments, the geofence service 130 and the data store 140 may be implemented as part of a provider network that includes computing resources configured to provide various services to clients and end users (e.g., a multi-tenant cloud provider).

The client 110 may include one or more client devices implemented on or across one or more computing devices including one or more processors and memories, according to some embodiments. The client 110 may be interchangeably referred to as the client device. The client 110 may implement or provide a location-based application or service 113 configured to perform various tasks or functions based on locations of end users, such as based on a current location of the end user devices 120, according to some embodiments. For example, the location-based application or service 113 may provide different levels of access or information based on whether the end user devices 120 are within particular locations. As a non-limiting, illustrative example, the location-based application or service 113 may include a delivery service that may track delivery drivers. The delivery service may be configured to track its delivery drivers but aim to prevent the geofence service 130 from being able to also track the delivery drivers. However, the delivery service may use the geofence service 130 to determine whether delivery drivers have arrived at pickup or delivery locations.

The client 110 may establish one or more geofence locations 112 for the location-based application or service 113, according to some embodiments. For example, the geofence locations 112 may include one or more locations that are within a geofence. The geofence may include a geographic region that causes the location-based application or service 113 to perform different functionality when the end user devices 120 are physically located within the geographic region, or cross boundaries of the geographic region (e.g., enter or exit the geographic region). The end user devices 120 may be considered to be within the geofence based on a determination that the current location of the end user devices 120 are physically located within the geographic region or locations established as being part of the geofence. In some embodiments, the client 110 may determine the geofence locations 112 based on requirements of the location-based application or service 113. For example, the location-based application or service 113 may perform different functions based on the end user devices 120 being physically present in the geofence locations 112. In other embodiments, the geofence locations 112 may represent physical locations that may trigger alerts or notifications when the end user devices 120 enter the designated physical locations. In some embodiments, the end user devices 120 may be detected as moving across boundaries of geographic regions defining the geofence. For example, the end user devices 120 may be located outside the geographic region at a first point in time and then move into the geographic region at a second point in time.

The client 110 may store representations of the geofence locations 112 in any suitable type of representation. For example, the geofence locations 112 may include a geometric representation, such as a polygonal representation or a plurality of vertices of a polygon. The geometric representation may also include a plurality of polygons (e.g., squares, hexagons, triangles, circles, etc.) that represent the geofence locations 112. As another example, the geofence locations 112 may include coordinates or other types of numerical representations that indicate geographical locations. In some embodiments, the geofence locations 112 may be converted to cells according to a geospatial indexing algorithm. For example, the geofence locations 112 may be expressed as a geospatial index of cells. In some embodiments, the geofence locations 112 may be stored as map data for the geofence.

The client 110 may utilize the geofence service 130 in a manner that preserves privacy of the end user devices 120 by obfuscating or encrypting the geofence locations 112 such that the geofence service 130 is unable to decipher or decrypt the geofence locations 112. The geofence service 130 may be configured to receive obfuscated, hashed or encrypted data while being able to perform queries or lookups based on the encrypted data. The client 110 may include application logic 114 configured to encrypt the geofence locations 112, according to some embodiments. For example, the application logic 114 may encrypt the geofence locations 112 according to one or more of a hash function 116 and a secret key 118. The application logic 114 may generate an encrypted geospatial index 119 based on the hash function 116 and the secret key 118.

The hash function 116 may receive the geofence locations 112 as input arguments, according to some embodiments. For example, the hash function 116 may take the geospatial index as an input and apply the hash function 116 to the cells of the geospatial index. In some embodiments, the hashed representation of the geofence locations 112 may be included as part of the encrypted geospatial index 119 generated by the application logic 114. For example, the hash function 116 may be applied to the representations of the geofence locations 112 to generate a hashed representation of the geofence locations 112. In some embodiments, the hash function 116 may be one-directional such that the geofence locations 112 may be converted or encoded to hash values or hash-based message authentication codes that are not convertible back to a representation of the geofence locations 112. Hash values may be interchangeably referred to as hash-based message authentication codes herein. For example, the hash values may not necessarily include any information that is comprehensible by an outside system or the geofence service 130. As another example, if an outside or malicious entity intercepts the hash values, the outside entity would be unable to decipher which locations were used to generate the hash values. In some embodiments, the hashed representation of the geofence locations 112 may include a plurality of hash values that represent a hierarchical structure for representing the geofence locations 112. For example, the hierarchical structure may include different levels of precision for indexing or identifying the geofence locations 112, such as different zoom levels or different accuracy levels for viewing the geofence locations 112.

As an additional security measure, the hash function 116 may generate the hashed representation of the geofence locations 112 according to a secret key 118, according to some embodiments. The secret key 118 may be private to the client 110 such that the secret key 118 is known only by the client 110 or entities granted access by the client 110, such as the end user devices 120. The client 110 may specifically withhold the secret key 118 from the geofence service 130 such that the secret key 118 is unknown to the geofence service 130, and the geofence service 130 does not have access to the secret key 118. In some embodiments, the secret key 118 may be specific to the location-based application or service 113. For example, the client 110 may offer many applications or services and have different, respective secret keys per-application.

For yet another security measure, the application logic 114 may randomize or shuffle an order of the hash values of the encrypted geospatial index 119. The randomized order may further prevent further deduction of information pertaining to the geofence locations 112. For example, by randomizing the order of the hash values, an outside entity or the geofence service 130 would be unable to conclude that the encrypted geospatial index is in ascending or descending order of precision or location.

The client 110 may also provide an encrypted representation of the geofence locations 112 as part of the encrypted geospatial index 119, according to some embodiments. Encrypted geofence locations may be included as part of the encrypted geospatial index 119 to allow the client 110 to verify the geofence locations 112 as a second pass test. In some embodiments, the location-based application or service 113 may be configured to perform the second pass test to verify that the end user devices 120 are within or outside of the geofence locations 112. The client 110 may be configured to encrypt the geofence locations 112 according to a cryptographic key. In some embodiments, the cryptographic key may include the secret key 118. In other embodiments, the cryptographic key may be different from the secret key 118.

The client 110 may send a request to establish a geofence with the geofence service 130 via the network 150, according to some embodiments. The request to establish the geofence may include the encrypted geospatial index 119, according to some embodiments. In some embodiments, the client 110 may send the encrypted geofence locations in addition to the encrypted geospatial index 119 as part of the request to establish the geofence. The client 110 may identify the geofence based on a geofence identifier as part of the request.

The geofence service 130 may receive the encrypted geospatial index 119 to establish a geofence identified by a geofence identifier on behalf of the client 110, according to some embodiments. For example, the geofence service 130 may include a control plane 134 configured to receive the request to establish the geofence from the client 110. In some embodiments, the client 110 may be configured to send the request to enable the geofence by the geofence service 130 for the client 110. The geofence service 130 may also be configured to receive requests to establish geofences in accordance with an API established by the control plane 134, according to some embodiments. For example, the client 110 may provide information pertaining to the geofence via the API, including the geofence identifier and the encrypted geospatial index 119. Further modifications to the geofence may be provided via the API.

The geofence service 130 may be configured to provide a network endpoint 136 for the client 110 to request establishment of geofences, according to some embodiments. For example, the control plane 134 configured to provide the network endpoint 136 to the client 110 in response to the request to establish the geofence. The client 110 may be configured to access the network endpoint 136 to request establishment of the geofence and provide information to facilitate the geofence, such as providing the encrypted geospatial index 119.

The geofence service 130 may establish the geofence for the geofence locations 112 as encrypted and represented by the encrypted geospatial index 119, according to some embodiments. The geofence service 130 may further include a query engine 138 configured to access the data store 140 on behalf of the client 110 or the end user devices 120, according to some embodiments. The query engine 138 may include one or more hardware components such as a network interface card device, a network controller, or any other device configured to manage network connections to another service or component of the provider network. In some embodiments, the query engine 138 may be configured to generate an access request to retrieve data from, write data to, or otherwise access the geofence database 142 at the data store 140. The query engine 138 may identify the geofence to query based at least in part on the geofence identifiers 144. The query engine 138 may then generate the access request based on identification of the geofence identifier and the corresponding encrypted geospatial index stored as part of the encrypted geospatial indexes 146.

The query engine 138 may send the access request to the data store 140, according to some embodiments. The data store 140 may process the access request to provide access to the geofence database 142, as described herein. In response to the access request, the data store 140 may return the encrypted geospatial index 144 to the geofence service 130. In some embodiments, the geofence service 130 may query the encrypted geospatial index 144 at the geofence database 142.

The end user devices 120 may include various computing devices, such as one or more processors and memories that cause the end user devices 120 to perform various functions, according to some embodiments. The end user devices 120 may include a location sensor 122 configured to determine a current location of the end user devices 120. For example, a given end user device 120 may determine the current location of the end user device 120 based on sensor data from the location sensor 122. In some embodiments, the location sensor 122 may include global positioning satellite (GPS) hardware configured to generate sensor data indicating a current location of the end user device 120. In other embodiments, the location sensor 122 may be configured to determine the current location of the end user device 120 based on local Wi-Fi signals. For example, the location sensor 122 may detect nearby Wi-Fi networks and obtain information about the physical location of the Wi-Fi networks to triangulate or otherwise determine the current location. The current location may be expressed as a numerical value that may be used in subsequent calculations, such as coordinates in degrees, minutes and seconds format, degrees and decimal minutes format, or decimal degrees format.

The end user devices 120 may receive perform tasks in accordance with the location-based application or service 113 of the client 110, according to some embodiments. For example, the end user devices 120 may be configured to perform tasks based on application logic 124. In some embodiments, the client 110 may provide the application logic 124 as part of distribution of an application relating to the location-based application or service 113. For example, the client 110 may provide the application logic 124 as an installable executable to be executed by the end user devices 120.

The application logic 124 may be configured to obfuscate or encrypt a representation of the current location as determined by the location sensor 122, according to some embodiments. For example, the application logic 124 may include a hash function 126 that is applied to the representation of the current location. The hash function 126 may include a cryptographic function configured to accept representations of locations as input arguments and generate cryptographically encoded representations of the locations, such as textual, numeric, or alphanumeric representations of the locations. The hash function 126 may receive the current location of the end user device 120, as determined based on the location sensor 122, as an input argument, according to some embodiments. In some embodiments, a hashed representation of the current location may be included as part of an encrypted device location identifier 129 generated by the application logic 124. For example, the hash function 126 may be applied to the representations of the current location to generate a hashed representation of the current location. In some embodiments, the hash function 126 may be one-directional such that the current location may be converted or encoded to hash values or hash-based message authentication codes that are not convertible back to a representation of the current location. For example, the hash values may not necessarily include any information that is comprehensible by an outside system or the geofence service 130. As another example, if an outside or malicious entity intercepts the hash values, the outside entity would be unable to decipher which locations were used to generate the hash values. In some embodiments, the hashed representation of the current location may include a plurality of hash values that represent a hierarchical structure for representing the current location. For example, the hierarchical structure may include different levels of precision for indexing or identifying the current location, such as different zoom levels or different accuracy levels for viewing the current location.

As an additional security measure, the hash function 126 may generate the hashed representation of the current location according to a secret key 128, according to some embodiments. The secret key 128 may be private to the client 120 such that the secret key 128 is known only by the client 120 or entities granted access by the client 120, such as the end user devices 120. The client 120 may specifically withhold the secret key 128 from the geofence service 130 such that the geofence service 130 does not have access to the secret key 128. In some embodiments, the secret key 128 may be specific to the location-based application or service 123. For example, the client 120 may offer many applications or services and have different, respective secret keys per-application. In some embodiments, the secret key 128 may be the same as the secret key 118 to maintain consistency between the format, encoding, or encryption of the encrypted geospatial index 119 and the encrypted device location identifier 129.

For yet another security measure, the application logic 124 may randomize or shuffle an order of the hash values of the encrypted device location identifier 129. The randomized order may further prevent further deduction of information pertaining to the current location. For example, by randomizing the order of the hash values, an outside entity or the geofence service 130 would be unable to conclude that the encrypted device location identifier 129 is in ascending or descending order of precision or location.

The end user device 120 may send the encrypted device location identifier 129 to the geofence service 130 via the network 150, according to some embodiments. The end user device 120 may indicate the geofence identifier for the geofence that is to be applied according to the location-based application or service 113. The end user device 120 may also provide an encrypted representation of the current location as part of the encrypted device location identifier 129, according to some embodiments. The encrypted current location may be included as part of the encrypted device location identifier 129 to allow the client 110 to verify the current location as a second pass test. In some embodiments, the location-based application or service 113 may be configured to perform the second pass test to verify that the end user devices 120 are within or outside of the geofence locations 112. The end user device 120 may be configured to encrypt the current location according to a cryptographic key. In some embodiments, the cryptographic key may include the secret key 128. In other embodiments, the cryptographic key may be different from the secret key 128.

The geofence service 130 may include geofence logic 132 configured to perform various tasks relating to the geofence and the geofence database 142, according to some embodiments. The geofence logic 132 may be configured to determine whether the end user device 120 is currently located within one or more of the geofence locations 112. In some embodiments, the geofence logic 132 may determine whether the end user device 120 is currently located within one or more of the geofence locations 112 based on querying the geofence database 142 according to the encrypted device location identifier 129.

The geofence service 130 may be configured to be unaware of the current location of the end user devices 120 by not being provided the cryptographic keys or the secret keys 118, 128 that may be used to decrypt the encrypted geospatial index 119 and the encrypted device location identifier 129. The geofence service 130 may also be prevented from decrypting the encrypted geofence locations and the encrypted current location of the end user devices 120. The geofence service 130 may perform queries based on the hashed representations provided by the client 110 and the end user devices 120. For example, the geofence logic 132 may be configured to determine whether there is a match or an inclusion of the encrypted device location identifier 129 within the encrypted geospatial index 146 stored in the geofence database 142 for a given geofence identified in the geofence identifiers 144.

The geofence logic 132 may cause the query engine 138 to retrieve or access the encrypted geospatial index 119 for a specified geofence as stored in the geofence database 142 as part of the encrypted geospatial indexes 146 and identified by the geofence identifier in the geofence identifiers 144. In some embodiments, the geofence logic 132 may implement a query of the encrypted geospatial index 146 according to the encrypted device location identifier 129. For example, the geofence logic 132 may determine whether hash values of the encrypted device location identifier 129 are included within the encrypted geospatial index 146 for the specified geofence identified in the geofence identifiers 144. In some embodiments, the query of the encrypted geospatial index 146 may include a key-value lookup process based on the encrypted device location identifier 129.

If the encrypted geospatial index 146 for the specified geofence includes at least a portion of the encrypted device location identifier (e.g., an included hash value), then the geofence logic 132 may determine that the end user device 120 is within one or more of the geofence locations 112. The geofence logic 132 may determine that the end user device 120 is within the geofence locations 112 without having actual location information of either the geofence locations 112 or the end user device 120.

Based on results of the query, the geofence service 130 may indicate to an event bus 160 whether the end user device 120 is located within the geofence locations 112, according to some embodiments. The event bus 160 may be configured to send an indication as to whether the end user device 120 is located within the geofence locations 112 to the client 110. The event bus 160 may be synchronous or asynchronous. In other embodiments, the geofence service 130 may return an indication as to whether the end user device 120 is located within the geofence locations 112 to the client 110 via the control plane 134 or the network endpoint 136. In some embodiments, the geofence service 130 may pass on the encrypted geofence locations and the encrypted current location of the end user device 120 that were provided to the geofence service 130. For example, the geofence service 130 may blindly pass the encrypted geofence locations and the encrypted current location back to the client 110.

The client 110 may receive the indication as to whether the end user device 120 is located within the geofence location 112 as determined by the geofence service 130, according to some embodiments. The client 110 may perform one or more tasks in accordance with the location-based application or service 113 based on whether the end user device 120 is located within the geofence locations 112. The client 110 may be configured to decrypt one or more of the encrypted geofence locations and the encrypted current location according to the cryptographic key used. The decrypted geofence locations and the decrypted current location may be used in a second pass test to verify whether the end user device 120 is located within the geofence locations 112.

Figure 2:
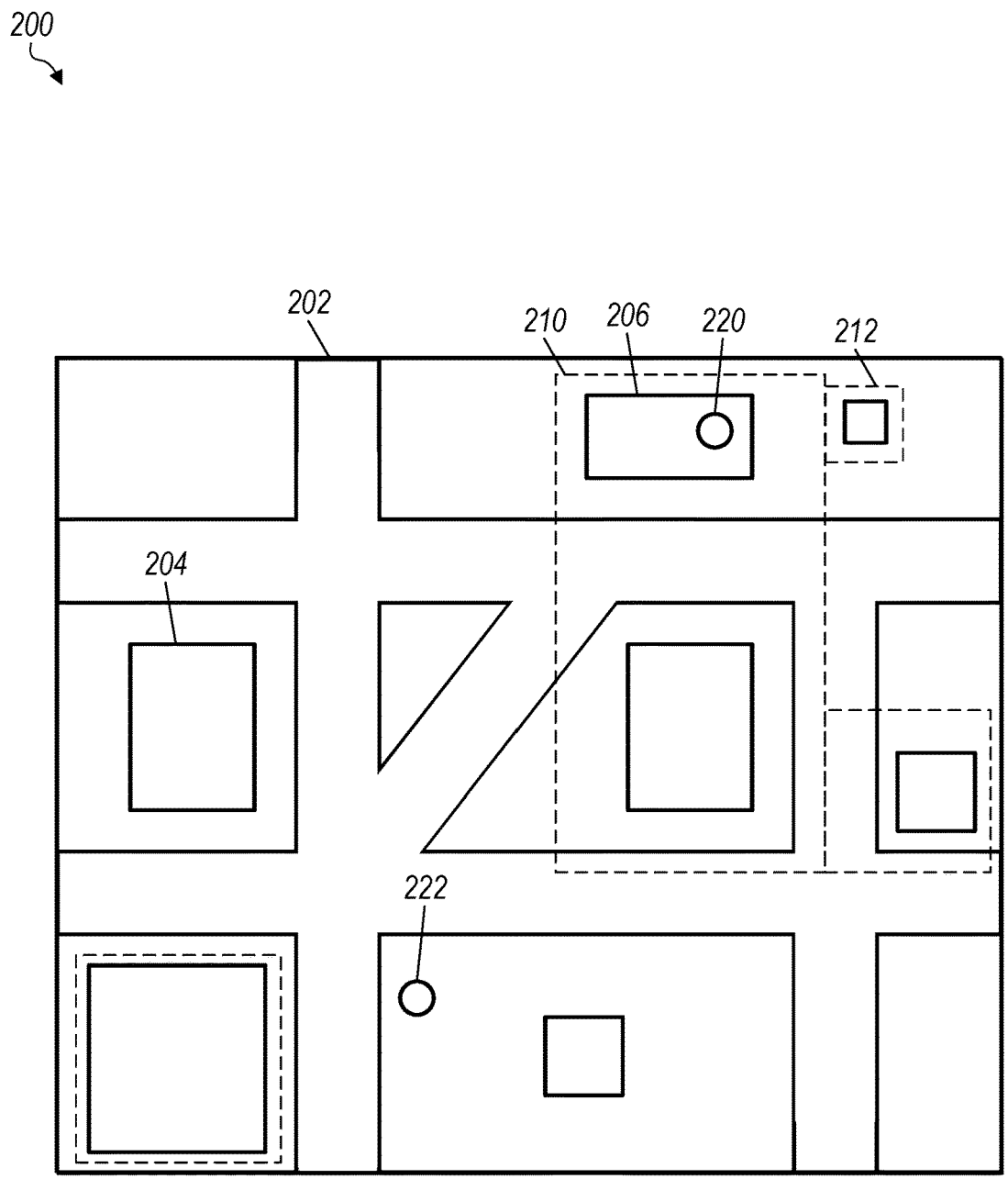
FIG. 2 illustrates a graphical representation of geofence map, according to some embodiments.

FIG. 2 illustrates a graphical representation of geofence map 200, according to some embodiments. The geofence map 200 is a graphical representation for illustrative purposes, but storage of the geofence map 200 in the geofence system 100 may be in a computer-readable format that is not necessarily visually laid out as depicted in FIG. 2. The geofence map 200 may include geofences 210 and 212, according to some embodiments. The geofences 210 and 212 may correspond to the geofence locations 112 of FIG. 1, in some embodiments. As an illustrative example, the geofence 210 is a different size and shape from the geofence 212. The different size and shape may be different levels of precision of geofenced locations in order to focus in on particular locations.

The geofence map 200 may include various elements in a locality, according to some embodiments. The geofence map 200 may indicate elements including one or more roads 202. The geofence map 200 may also include indications of buildings 204 and 206. As an illustrative example, the building 204 is not located within a geofence location, and the building 206 is located within a geofence location.

The geofence map 200 may indicate user device 220 and user device 222. The user devices 220 and 222 may correspond to the end user devices 120 of FIG. 1, in some embodiments. As an illustrative example, the user device 220 is shown as being within the geofence 210, and the user device 222 is shown as being outside of any geofence.

Figure 3:
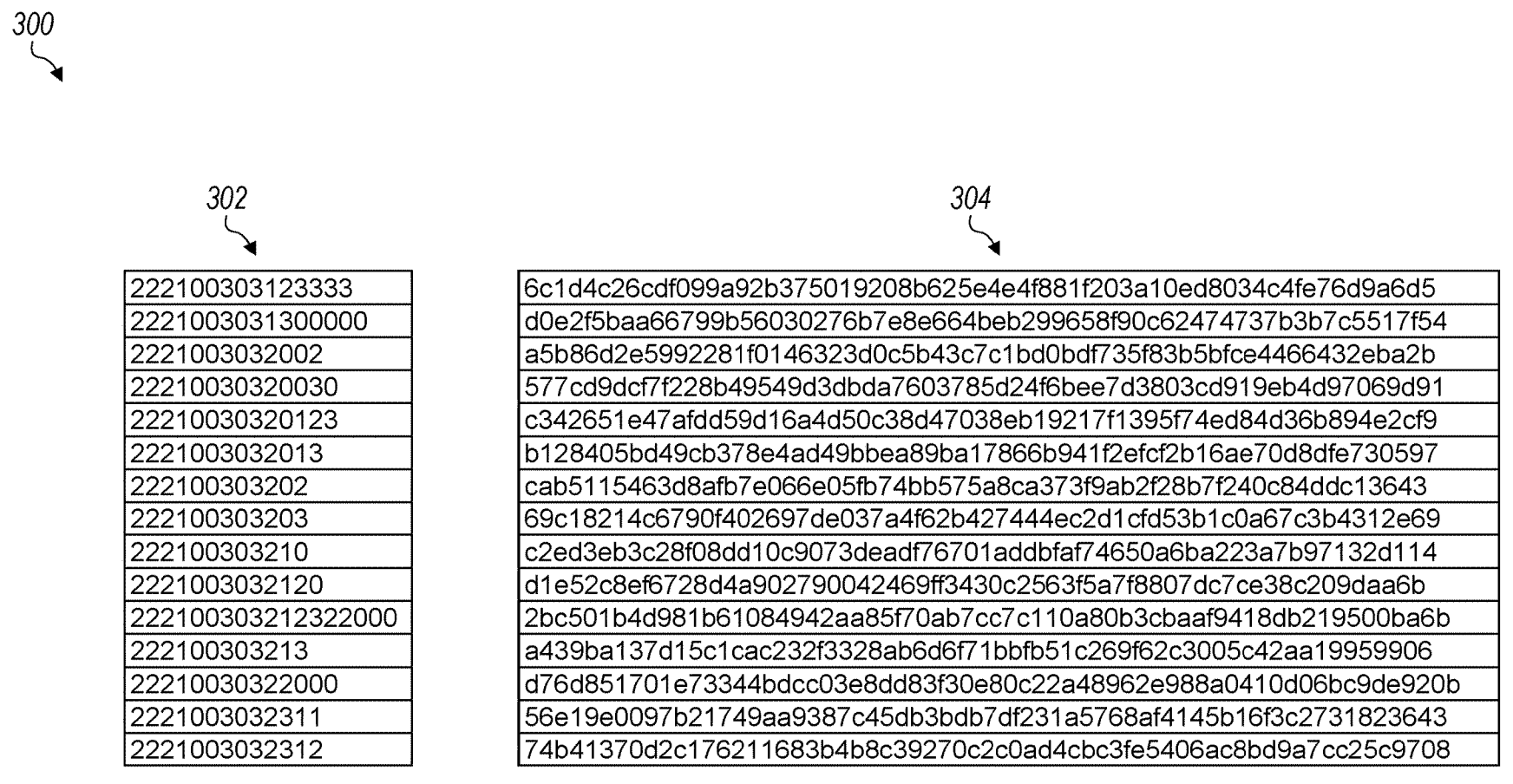

FIG. 3 illustrates representations 300 of geofence locations for a geofence, according to some embodiments. The geofence locations may correspond to the geofence locations 112 of FIG. 1 or the geofences 210 and 212 of FIG. 2, according to some embodiments.

The geofence locations may be converted to cells 302 in accordance with a geospatial indexing algorithm. The cells 302 may be generated from a geometric representation of the geofence locations, such as a polygon or coordinate representations of the geofence locations.

The cells 302 may be encrypted according to a hash function, such as the hash function 116 of FIG. 1, according to some embodiments. The hash function may be applied to the cells 302 to generate an encrypted geospatial index 304 of the geofence locations having a plurality of hash values. In some embodiments, an order of the encrypted geospatial index 304 may be shuffled or randomized such that the cells 302 and the encrypted geospatial index 304 may not have a direct correspondence when comparing a data structure, such as an array, of the cells 302 and the encrypted geospatial index 304. For example, the first entry of the cells 302 may not necessarily be the basis of the first entry of the encrypted geospatial index 304.

FIG. 4 illustrates representations 400 of a current location of a user device, according to some embodiments. The user device may correspond to the end user device 120 of FIG. 1 or the user devices 220 and 222 of FIG. 2, according to some embodiments.

The current location of the user device may be converted to cells 402 in accordance with a geospatial indexing algorithm. The cells 402 may be generated from a geometric representation of the current location, such as a coordinate representation of the current location. In some embodiments, the cells 402 may represent different resolutions of cells corresponding to different degrees of precision in identifying the current location.

The cells 402 may be encrypted according to a hash function, such as the hash function 126 of FIG. 1, according to some embodiments. The hash function may be applied to the cells 402 to generate an encrypted device location identifier 404 of the current location having a plurality of hash values. In some embodiments, an order of the hash values 404 may be shuffled or randomized such that the cells 402 and the encrypted device location identifier 404 may not have a direct correspondence when comparing a data structure, such as an array, of the cells 402 and the hash values 404. For example, the first entry of the cells 402 may not necessarily be the basis of the first entry of the encrypted device location identifier 404.

Figure 5:
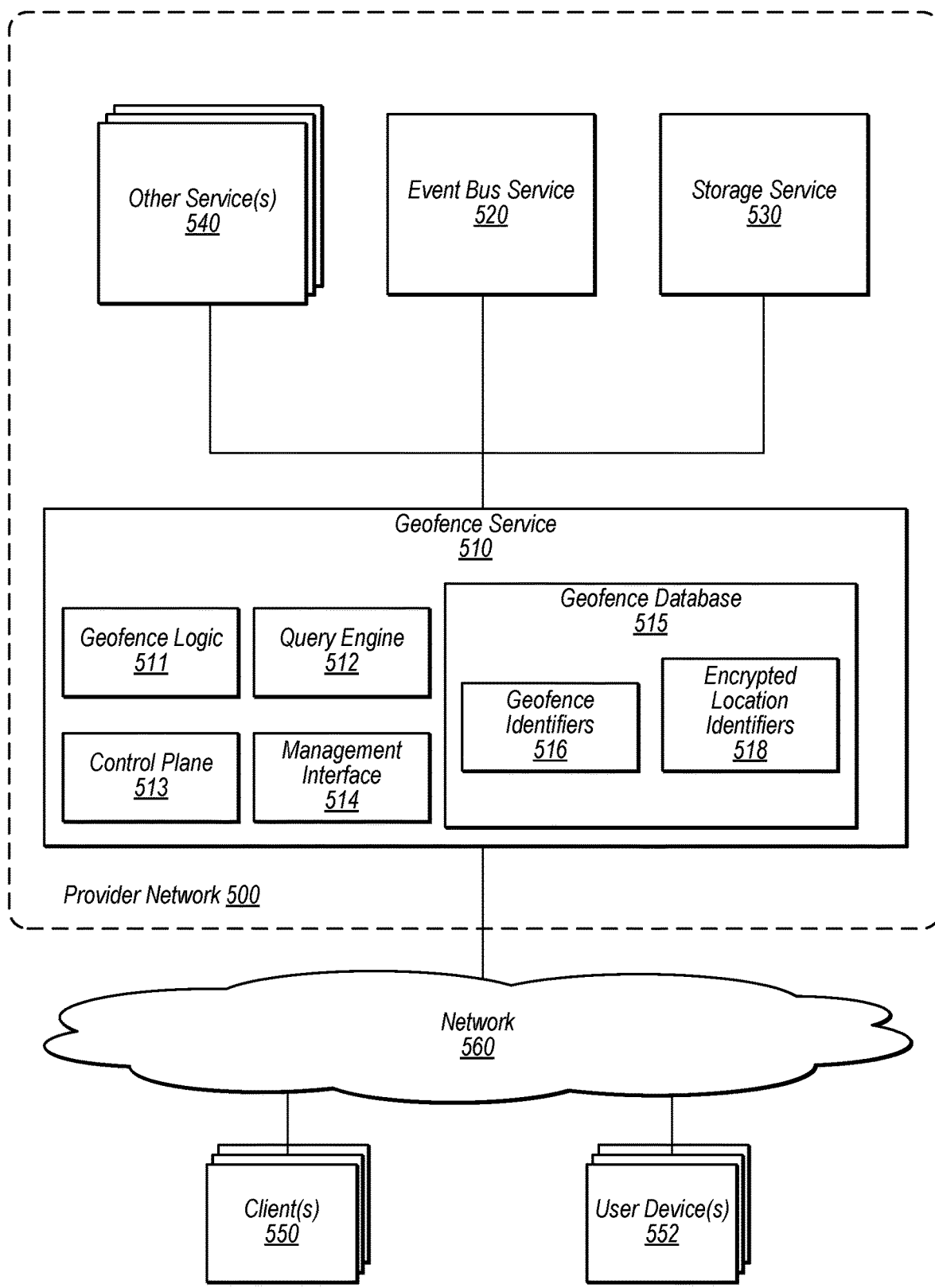
FIG. 5 illustrates a block diagram of provider network for managed geofence as a service, according to some embodiments.

FIG. 5 is a block diagram of provider network 500 for managed geofence as a service, according to some embodiments. The provider network 500 may be configured to provide various services to clients 550 and user devices 560 via a network 560, according to some embodiments. The provider network 500 may include virtual computing service 110 configured to provide computing services. The provider network 500 may also include a geofence service 520, a storage service 530, and other services 540, according to some embodiments.

The provider network 500 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 500 via a publicly accessible network (e.g., the Internet, a cellular communication network), such as the network 560. Regions are connected to a global network which includes private networking infrastructure (e.g., fiber connections controlled by the cloud provider) connecting each region to at least one other region. The provider network 500 may deliver content from points of presence outside of, but networked with, these regions by way of edge locations and regional edge cache servers. An edge location can be an extension of the cloud provider network outside of the traditional region/AZ context. For example, an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 500 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As noted above, provider network 500 may implement various computing resources or services, such as a geofence service 510, an event bus service 520, a block-based storage service 530, and other service(s) 540 which may be any other type of network based services, including various other types of storage (e.g., database service or an object storage service), data processing, analysis, communication, event handling, visualization, and security services not illustrated). The event bus service 520 may be configured to receive indications of events from the various services throughout the provider network 500 to interface with other services and external clients such as clients 550 and user devices 552.

In various embodiments, the components illustrated in FIG. 5 may be implemented directly within computer hardware, as instructions directly or indirectly executable by computer hardware (e.g., a microprocessor or computer system), or using a combination of these techniques. For example, the components of FIG. 5 may be implemented by a system that includes a number of computing nodes (or simply, nodes), each of which may be similar to the computer system embodiment illustrated in FIG. 11 and described below. In various embodiments, the functionality of a given system or service component (e.g., a component of data storage service 530) may be implemented by a particular node or may be distributed across several nodes. In some embodiments, a given node may implement the functionality of more than one service system component (e.g., more than one data store component).

Geofence service 510 may offer geofence resources according to various configurations for client 550 operation. For example, the geofence service 510 may include geofence logic 511 configured to determine whether the user devices 552 are located within a given geofence established by the clients 550. Management interface 514 may implement the workflows, tasks, or other operations to handle geofence requests, including, but not limited to establishing geofences, disabling geofences, or modifying geofences.

Geofence service 510 may implement a query engine 512 configured to interface with a geofence database 515. The geofence database 155 may store geofence identifiers 516 and encrypted geospatial indexes 518. The geofence identifiers 516 may identify respective geofences implemented for respective clients 550. The encrypted location identifiers 518, such as encrypted geospatial indexes, may be queried according to the respective geofence identifiers 516 to determine whether a user device 552 is within a given geofence for the client 550. The determination as to whether the user device 552 is within the given geofence may be made without the geofence service 510 being aware or having knowledge of the actual location of the user device 552.

Geofence service 510 may implement control plane 513, which may include various features to manage the geofence service 510 on behalf of client(s) 550, in some embodiments. For example, control plane 513 may implement various interfaces that transmit information on behalf of the clients 550 or the user devices 552. Control plane 513 may also implement the management interface 514, which may support various operations to configure or enable features, deploy, start, stop, pause, resume, or other controls for the geofence service 510. Control plane 513 may also support various features related to implementing geofences as a service.

Interfaces may include various types of interfaces, such as a command line interface, graphical user interface, and/or programmatic interface (e.g., Application Programming Interfaces (APIs)) in order to perform requested operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Provider network 500 may also implement block-based storage service 530, in various embodiments, for performing storage operations. Block-based storage service 530 may be a storage system that provides block level storage for storing one or more sets of data volumes of data that may be mapped to particular clients (e.g., a virtual compute instance of virtual compute service 510), providing virtual block-based storage (e.g., hard disk storage or other persistent storage) as a contiguous set of logical blocks. In some embodiments, block-based storage service 530 may store data in a data store.

Generally speaking, clients 550 may encompass any type of client configurable to submit network-based requests to provider network 500 via network 550, including requests for storage services. For example, a given client 550 may include a suitable version of a web browser or may include a plug-in module or other type of code module that may execute as an extension to or within an execution environment provided by a web browser. Alternatively, a client 550 may encompass an application (or user interface thereof), a media application, an office application or any other application that may make use of resources in provider network 500 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 550 may be an application may interact directly with provider network 500. In some embodiments, client 550 may generate network-based services requests according to a Representational State Transfer (REST)-style network-based services architecture, a document- or message-based network-based services architecture, or another suitable network-based services architecture.

In some embodiments, a client 550 may provide access to provider network 500 to other applications in a manner that is transparent to those applications. For example, client 550 may integrate with an operating system or file system to provide storage on a data storage service (e.g., a block-based storage service 530). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 550 and the operating system or file system on behalf of applications executing within the operating system environment.

Clients 550 and user devices 552 may convey network-based services requests to and receive responses from provider network 500 via network 560. In various embodiments, network 560 may encompass any suitable combination of networking hardware and protocols necessary to establish network-based-based communications between clients 550, user devices 552 and provider network 500. For example, network 560 may generally encompass the various telecommunications networks and service providers that collectively implement the Internet. Network 560 may also include private networks such as local area networks (LANs) or wide area networks (WANs) as well as public or private wireless networks. For example, both a given client 550 and provider network 560 may be respectively provisioned within enterprises having their own internal networks. In such an embodiment, network 560 may include the hardware (e.g., modems, routers, switches, load balancers, proxy servers, etc.) and software (e.g., protocol stacks, accounting software, firewall/security software, etc.) necessary to establish a networking link between given client 550 and the Internet as well as between the Internet and provider network 500. It is noted that in some embodiments, clients 550 may communicate with provider network 500 using a private network rather than the public Internet.

In some embodiments, provider network 500 may include the hardware (e.g., modems, routers, switches, load balancers, proxy servers, etc.) and software (e.g., protocol stacks, accounting software, firewall/security software, etc.) necessary to establish a networking links between different components of provider network 500, such as virtualization hosts, control plane components as well as external networks 560 (e.g., the Internet). In some embodiments, provider network 500 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 550 may be attached to the overlay network so that when a client 550 provides an IP address that they want to send packets to, the IP address is run in virtual space by communicating with a mapping service that knows where the IP overlay addresses are.

Figure 6:
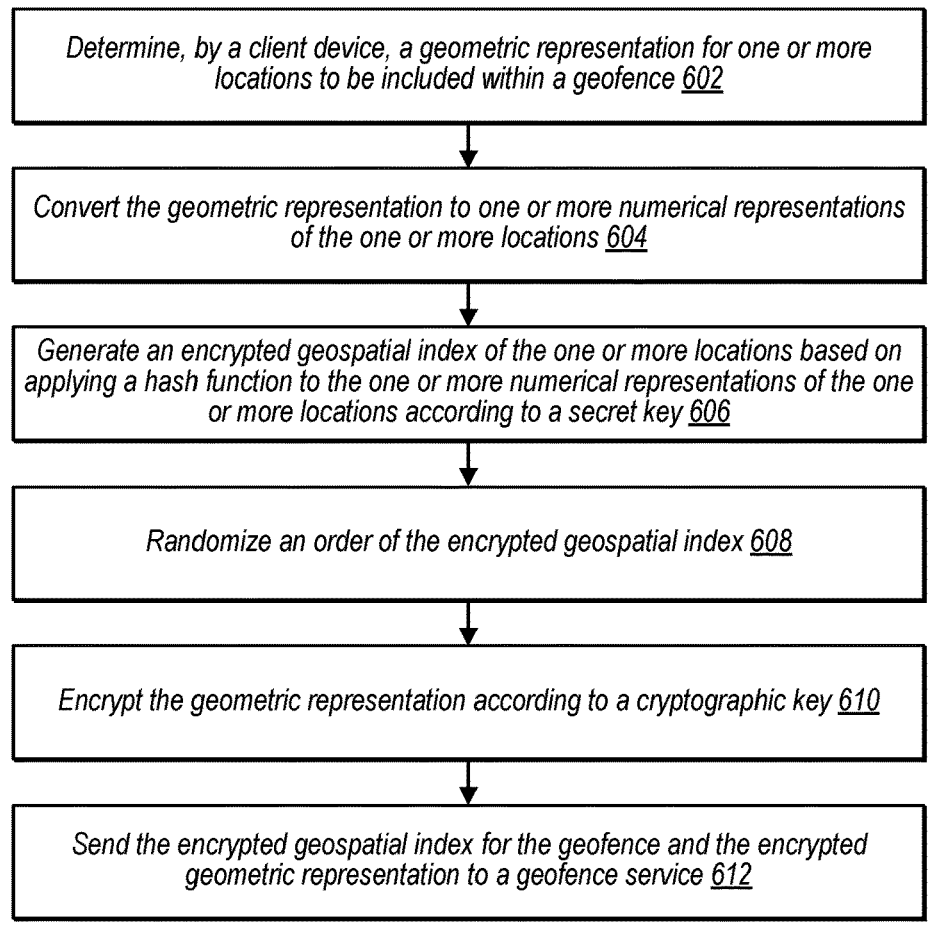
FIG. 6 illustrates a flowchart diagram for a method for generating a geofence configured to maintain privacy for user devices at a geofence service, according to some embodiments.

FIG. 6 illustrates a flowchart diagram for a method 600 for generating a geofence configured to maintain privacy for user devices at a geofence service, according to some embodiments. The method 600 may be performed by one or more computing devices having one or more processors and memories. The method 600 may be implemented by client devices, such as the client 110 of FIG. 1 or the clients 550 of FIG. 5, according to some embodiments. The geofence service may correspond to the geofence service 130 of FIG. 1 or the geofence service 510 of FIG. 5, according to some embodiments.

The method 600 includes determining, by a client device, a geometric representation for one or more geofence locations to be included within a geofence, at 602. The one or more geofence locations may correspond to the geofence locations 112 of FIG. 1 or the geofences 210 and 212 of FIG. 2, according to some embodiments. The client device may be configured to determine the geometric representation based on a physical location of the geofence locations, where the physical location may be identified based on a numerical identifier. For example, the numerical identifier may include coordinates that are used to locate the physical location. The geometric representation may include a polygonal representation or a plurality of vertices of a polygon. The geometric representation may also include a plurality of polygons (e.g., squares, hexagons, triangles, circles, etc.) that represent the geofence locations.

The method 600 also includes converting the geometric representation to one or more numerical representations of the one or more locations, at 604. The one or more numerical representations may correspond to the cells 302 of FIG. 3, according to some embodiments. The client device may be configured to perform conversion operations to transform the geometric representation to one or more cells according to a geospatial indexing algorithm, according to some embodiments. The cells may be expressed as numerical values of varying levels of precision, such as zoom levels per cell.

The method 600 further includes generating an encrypted geospatial index of the one or more locations based on applying a hash function to the one or more numerical representations of the one or more locations according to a secret key, at 606. The encrypted geospatial index may correspond to the encrypted geospatial index 119 of FIG. 1 or the encrypted geospatial index 304 of FIG. 3, according to some embodiments. The secret key may correspond to the secret key 118 of FIG. 1, according to some embodiments. The hash function may be applied to the numerical representations according to the secret key that is kept private from entities other than an application implemented by the client or the user devices. The hash function may output hash values for the numerical representations that are one-directional in nature, such that the hash values cannot be converted back to the numerical representations of the geofence locations, according to some embodiments. For example, the hash values may be encoded to obfuscate or encrypt the information that would otherwise identify the geofence locations to the geofence service.

The method 600 may also include randomizing an order of the encrypted geospatial index, at 608. In some embodiments, security of the encrypted geospatial index may optionally be increased by shuffling or randomizing the order of the hash values in the encrypted geospatial index. By randomizing the order, a malicious entity separate from the client or the user devices would be unable to deduce an order of the geofence locations.

The method 600 may further include encrypting the geometric representation according to a cryptographic key, at 610. In some embodiments, the geometric representation may be encrypted according to a cryptographic key prior to being sent to the geofence service. The cryptographic key is unknown to the geofence service such that the geofence service would be unable to decrypt or decode the encrypted geometric representation. The geofence service may be configured to blindly pass the encrypted geometric representation to a downstream service, such as another client-operated service or back to the client device itself. In some embodiments, the cryptographic key may be different from the secret key used to generate the encrypted geospatial index. In other embodiments, the cryptographic key may be the same as the secret key.

The method 600 may conclude by sending the encrypted geospatial index for the geofence and the encrypted geometric representation to a geofence service, at 612. In some embodiments, the client device may send the encrypted geospatial index and the encrypted geometric representation to the geofence service via a network connection, such as the Internet or a private intranet connection. In some embodiments, sending the encrypted geometric representation is optional because the geofence service being unable to decrypt the encrypted geometric representation and may be blindly passing the encrypted geometric representation to the client device.

FIG. 7 illustrates a flowchart diagram for a method 700 for establishing a geofence at a geofence service on behalf of a client, according to some embodiments. The method 700 may be performed by a geofence service, such as the geofence service 130 of FIG. 1 or the geofence service 510 of FIG. 5, according to some embodiments.

The method 700 includes receiving, at a geofence service from a client device, an encrypted geospatial index and an encrypted geometric representation of one or more locations for a geofence identified by a geofence identifier, at 702. The client device may correspond to the client 110 of FIG. 1 or the clients 550 of FIG. 5, according to some embodiments. The client device may be configured to generate the encrypted geospatial index and the encrypted geometric representation in accordance with the method 600 as described in FIG. 6. In some embodiments, the geofence service may receive the encrypted geospatial index and the encrypted geometric representation via a network, such as the Internet. In some embodiments, the geofence service may be unable to decrypt or interpret the encrypted geospatial index and the encrypted geometric representation to identify the one or more locations.

The method 700 includes storing or updating the encrypted geospatial index at a data store according to the geofence identifier, at 704. The data store may correspond to the data store 140 of FIG. 1, the geofence database 515 of FIG. 5, or the storage service 530 of FIG. 5, according to some embodiments. The geofence service may include a query engine, such as the query engine 138 of FIG. 1 or the query engine 512 of FIG. 5, according to some embodiments. The encrypted geospatial index may be stored in the data store for subsequent queries or access requests by the geofence service.

The method 700 concludes by sending a notification to an event bus indicating that the geofence is available at the geofence service, at 706. The event bus may correspond to the event bus 160 of FIG. 1 or the event bus service 520 of FIG. 5. In other embodiments, the notification may be sent back to the client device via an interface that was used in receiving the encrypted geospatial index and the encrypted geometric representation.

FIG. 8 illustrates a flowchart diagram for a method 800 for a user device generating an encrypted representation of a current location of the user device to be sent to a geofence service on behalf of a client, according to some embodiments. The method 800 may be performed by a user device, such as the end user devices 120 of FIG. 1, the user devices 220 and 222 of FIG. 2, or the user devices 552 of FIG. 5, according to some embodiments.

The method 800 includes determining a current location of a user device according to a location sensor of the user device, at 802. The location sensor may correspond to the location sensor 122 of FIG. 1, according to some embodiments. The location sensor may include GPS hardware configured to determine the current location. In other embodiments, the location sensor may include Wi-Fi hardware configured to determine the current location based on detected Wi-Fi networks.

The method 800 also includes determining one or more numerical representations of the current location of the user device, individual ones of the one or more numerical representations have different levels of precision of location tracking, at 804. The one or more numerical representations may correspond to the cells 402 of FIG. 4, according to some embodiments. The user device may be configured to perform conversion operations to transform the current location to one or more cells according to a geospatial indexing algorithm, according to some embodiments. The cells may be expressed as numerical values of varying levels of precision, such as zoom levels per cell.

The method 800 further includes generating an encrypted device location identifier for the current location based on applying a hash function to the one or more numerical representations of the current location according to a secret key, at 806. The encrypted device location identifier may correspond to the encrypted device location identifier 129 of FIG. 1, according to some embodiments. The secret key may correspond to the secret key 128 of FIG. 1, according to some embodiments. The encrypted device location identifier may include one or more hash values based on application of the hash function. The hash function may be applied to the numerical representations according to the secret key that is kept private from entities other than an application implemented by the client or the user devices. The hash function may output hash values for the numerical representations that are one-directional in nature, such that the hash values cannot be converted back to the numerical representations of the geofence locations, according to some embodiments. For example, the hash values may be encoded to obfuscate or encrypt the information that would otherwise identify the geofence locations to the geofence service. In some embodiments, the secret key used by the user device is the same as the secret key used by the client device such that the same secret key is shared by the user device and the client device.

The method 800 may also include randomizing an order of the encrypted device location identifier, at 808. In some embodiments, security of the encrypted device location identifier may optionally be increased by shuffling or randomizing the order of the hash values in the encrypted geospatial index. By randomizing the order, a malicious entity separate from the client or the user devices would be unable to deduce a precision level of the current location.

The method 800 may further include generating an encrypted representation of the current location based on encrypting the one or more numerical representations of the current location according to a cryptographic key, at 810. In some embodiments, the representation of the current location may be encrypted according to a cryptographic key prior to being sent to the geofence service. The cryptographic key is unknown to the geofence service such that the geofence service would be unable to decrypt or decode the encrypted representation of the current location. The geofence service may be configured to blindly pass the encrypted representation of the current location to a downstream service, such as another client-operated service or back to the client device itself. In some embodiments, the cryptographic key may be different from the secret key used to generate the encrypted geospatial index. In other embodiments, the cryptographic key may be the same as the secret key.

The method 800 concludes by sending the encrypted device location identifier and the encrypted representation of the current location to a geofence service to allow the geofence service to determine whether the user device is within a geofence, at 812. In some embodiments, the user device may send the encrypted device location identifier and the encrypted representation of the current location to the geofence service via a network connection, such as the Internet or a private intranet connection. In some embodiments, sending the encrypted representation of the current location is optional because the geofence service being unable to decrypt the encrypted representation of the current location and may be blindly passing the encrypted representation to the client device.

FIG. 9 illustrates a flowchart diagram for a method 900 for determining whether a user device is in a geofence location based on an encrypted device location identifier, according to some embodiments. The method 900 may be performed by a geofence service, such as the geofence service 130 of FIG. 1 or the geofence service 510 of FIG. 5, according to some embodiments.

The method 900 includes receiving, at a geofence service, an encrypted device location identifier and an encrypted representation of a current location of a user device, where the encrypted device location identifier is generated based on the current location of the user device, at 902. The encrypted device location identifier may correspond to the encrypted device location identifier 129 of FIG. 1, according to some embodiments. In some embodiments, the geofence service may receive the encrypted device location identifier from the user device via an interface implemented by the geofence service for user devices.

The method 900 includes identifying a geofence and an encrypted geospatial index for one or more locations included within the geofence, at 904. In some embodiments, the geofence may be identified based on information included in the encrypted device location identifier indicating the geofence that is to be used. The encrypted geospatial index may be identified based on a geofence identifier for the geofence. In some embodiments, the geofence service may perform a key-value lookup in a geofence database to identify the geofence and the encrypted geospatial index.

The method 900 also includes querying the encrypted geospatial index according to the encrypted device location identifier, at 906. The geofence service may include a query engine, such as the query engine 138 of FIG. 1 or the query engine 512 of FIG. 5, according to some embodiments. In some embodiments, the encrypted geospatial index may include a plurality of hash values that have no intrinsic information that is understandable by the geofence service. However, the geofence service may be configured to at least search and query the encrypted geospatial index to determine whether other location identifiers are present in the encrypted geospatial index. In some embodiments, the geofence service may perform a key-value lookup to determine whether the encrypted geospatial index includes the encrypted device location identifier.

The method 900 further includes determining whether the encrypted device location identifier is included in the encrypted geospatial index, at 908. In some embodiments, results of the query may be used by the geofence service to make a determination as to whether the encrypted device location identifier is included in the encrypted geospatial index. The geofence service may make the determination without knowledge of the actual current location of the user device, such that the geofence service maintains privacy of the current location of the user device.

Based on a determination that the encrypted device location identifier is included in the encrypted geospatial index, the method 900 includes sending a notification to an event bus indicating that the current location of the user device is within the one or more locations of the geofence based on results of the query, where the notification includes the one or more encrypted representation, at 910. The event bus may correspond to the event bus 160 of FIG. 1 or the event bus service 520 of FIG. 5. In other embodiments, the notification may be sent back to the client device via an interface that was used in receiving the encrypted geospatial index and the encrypted geometric representation.

Based on a determination that the encrypted device location identifier is not included in the encrypted geospatial index, the method 900 includes a notification to the event bus indicating that the current location of the user device is not within the one or more locations of the geofence based on the results of the query, where the notification includes the one or more encrypted representation, at 912.

FIG. 10 illustrates a flowchart diagram for a method 1000 for implementing a location-based application or service that receives indications of whether a user device is at a geofence location, according to some embodiments. The method 100 may be performed by a client device, such as the client 110 of FIG. 1 or the clients 550 of FIG. 5. The client device may be configured to implement a location-based application or service, such as the location-based application or service 113 of FIG. 1, according to some embodiments.

The method 1000 includes receiving, at a client device from an event bus of a geofence service, information including an indication of whether a current location of a user device is located within a geofence and an encrypted representation of the current location, at 1002. The event bus may correspond to the event bus 160 of FIG. 1 or the event bus service 520 of FIG. 5. The information provided by the geofence service may include the results of the query as performed in 906 of FIG. 9.

The method 1000 also includes decrypting the encrypted representation of the current location according to a cryptographic key to generate a decrypted representation of the current location, at 1004. In some embodiments, the geofence service may blindly pass the encrypted representation of the current location to the client device. The cryptographic key may be available to the client device and the user devices such that the client device may decrypt data that was encrypted at the user device according to the cryptographic key. The geofence service may not necessarily be provided with the cryptographic key.

The method 1000 further includes verifying whether the current location of the user device is located within the geofence based on the decrypted representation of the current location, at 1006. In some embodiments, the client device may perform a second pass test as a redundant measure in addition to the geofence service providing the indication that the user device is located within the geofence.

The method 1000 concludes by performing one or more tasks of a location-based application or service based on whether the current location of the user device is within the geofence, at 1008. In some embodiments, the location-based application or service may include one or more triggers that cause actions to be performed in response to the location of the user device.

Figure 11:
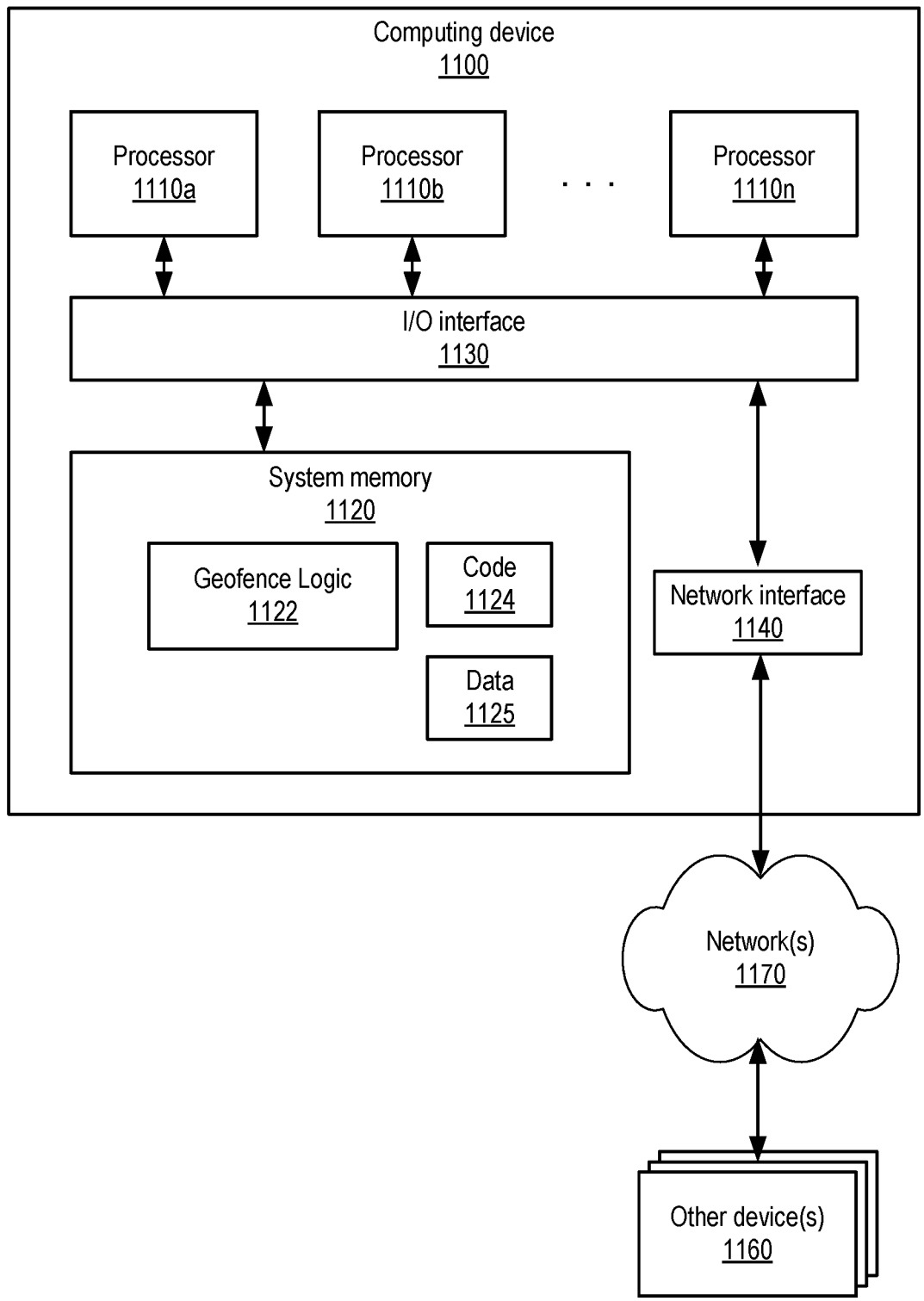
FIG. 11 illustrates a block diagram illustrating an example computer system that may be used in some embodiments.

Any of various computer systems may be configured to implement techniques for managing memory compression in a secure manner, as disclosed herein. For example, FIG. 11 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 1100 such as that illustrated in FIG. 11 or one or more components of the computer system 1100 that function in a same or similar way as described for the computer system 1100.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or downloadable application, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions on or across the processors 1110. For example, in various embodiments, processors 1110 may be embedded processors implementing any of a variety of instruction set architectures (ISAs), such as the x86, x86-64, ARM, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 1120 as program instructions 1124. In some embodiments, system memory 1120 may include data 1125 which may be configured as described herein. In some embodiments, system memory 1120 may include geofence logic 1122. For example, geofence logic 1122 may perform the functions of the client 110, the end user devices 120, or the geofencing service 130 of FIG. 1, or the functions of the clients 550, the user devices 552, or the geofence service 510 of FIG. 5.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as between client devices (e.g., 1160, etc.) and other computer systems, or among hosts, for example. In particular, network interface 1140 may be configured to allow communication between computer system 1100 and/or various other devices 1160 (e.g., I/O devices). Other devices 1160 may include scanning devices, display devices, input devices and/or other communication devices, as described herein. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks 1170, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g., SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, which may be implemented via network interface 1140.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 1100, including one or more processors 1110 and various other devices (though in some embodiments, a computer system 1100 implementing an I/O device 1150 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1100. In general, an I/O device (e.g., cursor control device, keyboard, or display(s) may be any device that can communicate with elements of computing system 1100.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices comprising:
one or more processors; and
one or more memories storing instructions that, when executed on or across the one or more processors, cause the one or more computing devices to implement a geofence service configured to:
receive an encrypted geospatial index for a specified geofence comprising a geofence location hash value generated based on application of a hash function to respective ones of a plurality of locations for the specified geofence in accordance with a secret key, wherein the secret key is unknown to the geofence service;
store the encrypted geospatial index to a data store according to a geofence identifier for the specified geofence;
receive an encrypted device location identifier comprising a hash value generated based on application of the hash function to a representation of a current location of a user device in accordance with the secret key;
determine whether the user device is located in a location within the geofence specified according to the plurality of locations based on a query of the encrypted geospatial index according to the encrypted device location identifier; and
based on a determination that the user device is located in the location of the plurality of locations, provide an indication that the user device is located in the location of the plurality of locations.

2. The system of claim 1, wherein the geofence service is further configured to:
implement a first interface configured to receive a request to establish the specified geofence, wherein the request comprises the encrypted geospatial index from a client device; and
implement a second interface configured to receive the encrypted device location identifier from the user device.

3. The system of claim 1, further comprising an event bus configured to manage event notifications on behalf of the geofence service and the client device, wherein the indication is provided from the geofence service to the event bus.

4. The system of claim 1, wherein the query comprises a key-value lookup of the encrypted device location identifier in the encrypted geospatial index.

5. The system of claim 1, wherein the geofence service is implemented as part of a provider network.

6. A method, comprising:
receiving, by a geofence service, an encrypted device location identifier generated based on application of a hash function to a representation of a current location of a user device in accordance with a secret key;
querying an encrypted geospatial index for a geofence according to the encrypted device location identifier to determine whether the user device is located within the geofence, wherein the encrypted geospatial index is generated based on application of the hash function to the geofence in accordance with the secret key; and
based on a determination that the user device is located within the geofence, providing an indication that the user device is located in the geofence.

7. The method of claim 6, further comprising:
receiving the encrypted geospatial index for the geofence; and
storing the encrypted geospatial index to a data store according to a geofence identifier for the geofence.

8. The method of claim 6, further comprising:
implementing a first interface configured to receive a request to establish the geofence from a client device; and
implementing a second interface configured to receive the encrypted device location identifier from the user device.

9. The method of claim 8, wherein the indication is provided to the client device via the first interface.

10. The method of claim 6, wherein the indication is provided from the geofence service to an event bus configured to manage event notifications on behalf of the geofence service and the client device.

11. The method of claim 6, wherein the encrypted geospatial index comprises a plurality of hash-based message authentication codes for the geofence encrypted according to the secret key, and wherein the encrypted device location identifier comprises hash-based message authentication codes for the current location of the user device encrypted according to the secret key.

12. The method of claim 6, further comprising:
based on a determination that the user device is not located within the geofence, providing an indication that the user device is not located within the geofence.

13. The method of claim 6, wherein querying the encrypted geospatial index comprises performing a key-value lookup of the encrypted geospatial index for the encrypted device location identifier.

14. One or more non-transitory computer-readable storage media storing instructions that, when executed on or across one or more processors, cause the one or more processors to implement a geofence service configured to:
in response receipt of an encrypted device location identifier generated based on application of a hash function to a representation of a current location of a user device in accordance with a secret key, identify an encrypted geospatial index for a geofence for the user device;
query the encrypted geospatial index according to the encrypted device location identifier to determine whether the user device is located within the geofence, wherein the encrypted geospatial index is generated based on application of the hash function to the geofence in accordance with the secret key; and
based on a determination that the user device is located within the geofence, provide an indication that the user device is located in the geofence.

15. The one or more non-transitory computer-readable storage media of claim 14, further comprising instructions that, when executed on or across the one or more processors, cause the one or more processors to:
in response to receiving the encrypted geospatial index for the geofence, store the encrypted geospatial index to a data store according to a geofence identifier for the geofence.

16. The one or more non-transitory computer-readable storage media of claim 15, further comprising instructions that, when executed on or across the one or more processors, cause the one or more processors to:
to query the encrypted geospatial index, perform a key-value lookup of the encrypted geospatial index for the encrypted device location identifier.

17. The one or more non-transitory computer-readable storage media of claim 14, further comprising instructions that, when executed on or across the one or more processors, cause the one or more processors to:
implement a first interface configured to receive a request to establish the geofence from a client device; and
implement a second interface configured to receive the encrypted device location identifier from the user device.

18. The one or more non-transitory computer-readable storage media of claim 17, wherein the indication is provided to the client device via the first interface.

19. The one or more non-transitory computer-readable storage media of claim 14, wherein the indication is provided from the geofence service to an event bus configured to manage event notifications on behalf of the geofence service and the client device.

20. The one or more non-transitory computer-readable storage media of claim 14, wherein the encrypted geospatial index comprises a plurality of hash-based message authentication codes for the geofence encrypted according to the secret key, and wherein the encrypted device location identifier comprises hash-based message authentication codes for the current location of the user device encrypted according to the secret key.

\* \* \* \* \*